US012767243B2

(12) United States Patent
Moura et al.

(10) Patent No.: US 12,767,243 B2
(45) Date of Patent: Oct. 20, 2026

(54) VEHICLE WITH EXTENDED LENGTH AIR DEFLECTORS

(71) Applicant: Volvo Truck Corporation, Gothenburg (SE)

(72) Inventors: Luis Moura, Curitiba (BR); Fernando Zarpelon, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 321 days.

(21) Appl. No.: 18/685,625

(22) PCT Filed: Nov. 17, 2021

(86) PCT No.: PCT/BR2021/050503
§ 371 (c)(1),
(2) Date: Feb. 22, 2024

(87) PCT Pub. No.: WO2023/087084
PCT Pub. Date: May 25, 2023

(65) Prior Publication Data
US 2024/0262434 A1 Aug. 8, 2024

(51) Int. Cl.
*B62D 25/02* (2006.01)
*B62D 35/00* (2006.01)

(52) U.S. Cl.
CPC ........... *B62D 35/001* (2013.01); *B62D 25/02* (2013.01)

(58) Field of Classification Search
None
See application file for complete search history.

(56) References Cited

U.S. PATENT DOCUMENTS 3,711,146 A * 1/1973 Madzsar .............. B62D 35/001 296/180.2
4,685,715 A * 8/1987 Hardin ................. B62D 35/001 296/180.3
(Continued)

FOREIGN PATENT DOCUMENTS

DE 102019004968 A1 1/2021
WO WO-2025088027 A1 * 5/2005 ........... B62D 35/002
(Continued)

OTHER PUBLICATIONS

Extended European Search Report for European Patent Application No. 21964283.2, mailed Oct. 10, 2025, 9 pages.
(Continued)

*Primary Examiner* — Aaron L Lembo
(74) *Attorney, Agent, or Firm* — Withrow & Terranova, PLLC

(57) ABSTRACT

Aspects of the disclosure relate to a vehicle with extended length air deflectors. The vehicle includes a chassis comprising a front axle and a rear axle. The vehicle further includes a cab mounted to the chassis. The cab has a first sidewall, a second sidewall, and a rear wall. The vehicle further includes a first air deflector positioned proximate to the first sidewall. The first air deflector includes a body having an outer surface and a front edge configured to be positioned proximate the cab, the outer surface of the body of the first air deflector aligned with an outer surface of the first sidewall in a deployed position. In certain embodiments, a front edge of the first air deflector is offset from the rear wall to define a first gap. In certain embodiments, the first air deflector is mounted to the chassis of the vehicle.

18 Claims, 8 Drawing Sheets

(56) References Cited

U.S. PATENT DOCUMENTS

| | | | | |
|---|---|---|---|---|
| 4,904,015 | A * | 2/1990 | Haines | B62D 35/001 296/180.3 |
| 5,114,205 | A * | 5/1992 | Jee | B60J 1/2002 454/131 |
| 5,522,637 | A * | 6/1996 | Spears | B62D 35/001 296/180.5 |
| 6,428,084 | B1 * | 8/2002 | Liss | B62D 53/06 296/180.1 |
| 6,846,035 | B2 * | 1/2005 | Wong | B62D 35/001 296/180.1 |
| 7,712,822 | B2 * | 5/2010 | Pfaff | B62D 35/001 296/180.5 |
| 8,403,401 | B2 * | 3/2013 | Rinehart | B62D 35/001 296/180.3 |
| 10,000,245 | B2 * | 6/2018 | Wall, II | B62D 35/001 |
| 10,137,945 | B2 * | 11/2018 | Burrows | B62D 37/02 |
| 12,037,050 | B2 * | 7/2024 | Weber | B62D 35/001 |
| 2003/0227194 | A1 * | 12/2003 | Farlow | B62D 35/001 296/180.4 |
| 2012/0038183 | A1 | 2/2012 | Brewer | |
| 2019/0047639 | A1 * | 2/2019 | Deligiannis | B62D 25/02 |
| 2019/0367104 | A1 * | 12/2019 | Damon | B62D 35/008 |
| 2021/0070378 | A1 * | 3/2021 | Duncanson | B62D 35/001 |

FOREIGN PATENT DOCUMENTS

| | | | | |
|---|---|---|---|---|
| WO | WO-2015191472 | A1 * | 12/2015 | B62D 35/001 |
| WO | 2016032421 | A1 | 3/2016 | |

OTHER PUBLICATIONS

International Search Report and Written Opinion for International Patent Application No. PCT/BR2021/050503, mailed Feb. 24, 2022, 9 pages.

* cited by examiner

VEHICLE WITH EXTENDED LENGTH AIR DEFLECTORS

This application is a 35 USC 371 national phase filing of International Application No. PCT/BR2021/050503, filed Nov. 17, 2021, the disclosure of which is incorporated herein by reference in its entirety.

FIELD OF THE DISCLOSURE

The disclosure relates generally to a vehicle. In particular aspects, the disclosure relates to a vehicle with extended length air deflectors.

BACKGROUND

Trucking vehicles include clearance space between the cab and the trailer to provide back of cab access (BOCA), to avoid interference when the tractor is turned relative to the trailer, and to comply with truck regulations (e.g., truck length, front axle load, etc.). This gap between the cab and the trailer can create significant drag at highway speeds as the air moves around the cab and into the space between the cab and the trailer, reducing fuel economy. However, reducing this gap may be complicated due to regulations in certain jurisdictions (e.g., truck length, front axle load, etc.), particularly for cab-over engine vehicles.

SUMMARY

According to an aspect of the disclosure, a vehicle includes a chassis comprising a front axle and a rear axle. The vehicle further includes a cab mounted to the chassis. The cab has a first sidewall, a second sidewall, and a rear wall extending between the first and second sidewalls. The vehicle further includes a first air deflector positioned proximate to the first sidewall. The first air deflector includes a body having an outer surface and a front edge configured to be positioned proximate the cab, the outer surface of the body of the first air deflector aligned with an outer surface of the first sidewall in a deployed position. The front edge of the first air deflector is offset from the rear wall to define a first gap.

In certain embodiments, the vehicle includes a cab-over engine vehicle. In certain embodiments, the front axle load is less than about 6.6 tons. In certain embodiments, the first sidewall of the cab further comprises a lip flaring rearward and outward from a rear edge of the first sidewall.

In certain embodiments, the first air deflector is mounted to the chassis of the cab. In certain embodiments, the first air deflector is mounted to a bracket attached to a frame rail of the chassis. In certain embodiments, the first air deflector is configured to rotate inwardly from the deployed position to a folded position. In certain embodiments, the body has a deflector length from the front edge to a rear edge of at least 0.70 meters. In certain embodiments, the gap is at least 25 mm.

In certain embodiments, the vehicle further includes a second air deflector positioned proximate to the second sidewall. The second air deflector includes a body having an outer surface and a front edge configured to be positioned proximate the cab. The outer surface of the body of the second air deflector is aligned with an outer surface of the second sidewall in a deployed position. The front edge of the second air deflector is offset from the rear wall of the cab to define a second gap.

According to another aspect of the disclosure, a vehicle includes a chassis comprising a front axle and a rear axle. The vehicle further includes a cab mounted to the chassis, the cab having a first sidewall, a second sidewall, and a rear wall extending between the first and second sidewalls. The vehicle further includes a first air deflector positioned proximate to the first sidewall. The first air deflector includes a body having an outer surface and a front edge configured to be positioned proximate the cab. The outer surface of the body of the first air deflector is aligned with an outer surface of the first sidewall in a deployed position. The first air deflector is mounted to the chassis of the vehicle.

In certain embodiments, the vehicle comprises a cab-over engine vehicle. In certain embodiments, the front axle load is less than about 6.6 tons.

In certain embodiments, the first air deflector is not attached to and is unsupported by the cab. In certain embodiments, the first air deflector is mounted to a bracket attached to a frame rail of the chassis. In certain embodiments, the first air deflector is configured to rotate inwardly from the deployed position to a folded position.

In certain embodiments, the body has a deflector length from the front edge to a rear edge of at least 0.70 meters. In certain embodiments, the front edge of the first air deflector is offset from the rear wall to define a first gap. In certain embodiments, the gap is at least 25 mm.

In certain embodiments, one of the two sidewalls of the cab further comprises a lip flaring rearward and outward from a rear edge of the one of the two sidewalls.

In certain embodiments, the vehicle further includes a second air deflector positioned proximate to the second sidewall. The second air deflector includes a body having an outer surface and a front edge configured to be positioned proximate the cab. The outer surface of the body of the second air deflector is aligned with an outer surface of the second sidewall in a deployed position. The front edge of the second air deflector is offset from the rear wall of the cab to define a second gap.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary and are intended to provide an overview or framework for understanding the nature and character of the claims. The accompanying drawings are included to provide a further understanding and are incorporated in and constitute a part of this specification. The drawings illustrate one or more embodiment(s), and together with the description, serve to explain the principles and operation of the various embodiments.

BRIEF DESCRIPTION OF THE DRAWINGS

The accompanying drawing figures incorporated in and forming a part of this specification illustrate several aspects of the disclosure, and together with the description, serve to explain the principles of the disclosure.

DETAILED DESCRIPTION

Figure 1:
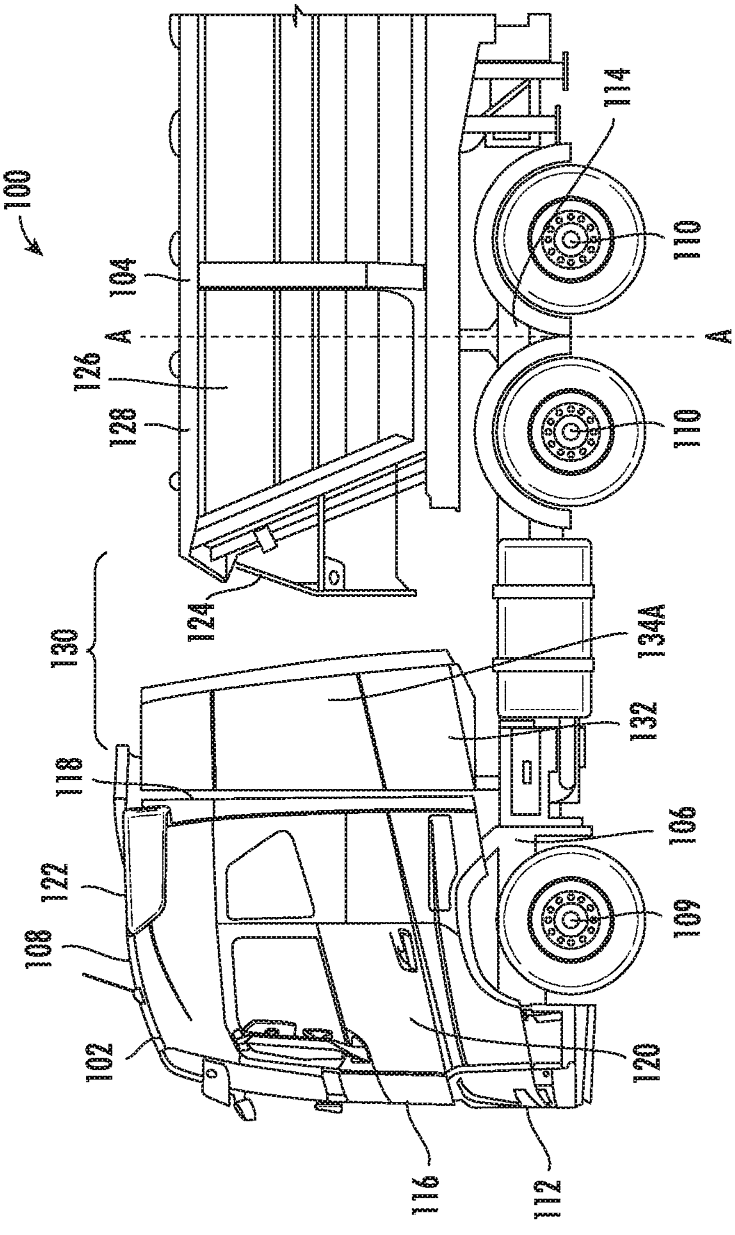
FIG. 1 is a side view of a tractor-trailer combination vehicle with a panel apparatus positioned between a cab and a trailer.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

FIG. 1 illustrates a tractor-trailer combination vehicle 100 including a truck 102 (which may also be referred to as a tractor, tractor unit, etc.) and a trailer 104 (which may also be referred to as a semi-trailer) attached to and pulled by the truck 102. The truck 102 and the trailer 104 are shown in an aligned orientation for normal forward movement. The truck 102 includes a chassis 106 (which may also be referred to herein as a frame) and a cab 108 (which may also be referred to herein as truck cab) mounted on the chassis 106. The chassis 106 includes a front axle 109 and one or more rear axles 110. Although only one side of the tractor-trailer combination vehicle 100 is shown, it is to be understood that the same features may be provided on both sides of the tractor-trailer combination vehicle 100, unless otherwise noted.

The chassis 106 includes a front portion 112 and a rear portion 114, with the cab 108 attached to a top of the front portion 112 of the chassis 106, and the trailer 104 pivotally coupled to a fifth wheel (not illustrated) mounted on a top of the rear portion 114 of the chassis 106. The cab 108 includes a front 116, a rear wall 118 (opposite the front 116), and sidewalls 120 extending therebetween, as well as a top 122. In other words, the rear wall 118 extends between the sidewalls 120. The trailer 104 includes a front 124, sidewalls 126, and a top 128. The trailer 104 attaches to the truck 102 such that the trailer 104 can pivot about a vertical axis A relative to the cab 108. The vertical axis extends through the top 128 of the trailer 104. Further, the sidewalls 120 of the cab 108 are generally aligned with the sidewalls 126 of the trailer 104 when in a straight orientation (i.e., when the cab 108 is aligned with the trailer 104).

A gap 130 (corresponding in location to a back of cab area) is defined between the rear wall 118 (which may also be referred to as a back wall, etc.) of the cab 108 and the front 124 of the trailer 104. In certain embodiments, the gap 130 length is in a range of from 1.5 m to 2.5 m. Decreasing this gap 130 would improve aerodynamic performance by decreasing drag. However, decreasing the gap 130 is restricted in certain jurisdictions by a front axle limit (e.g., of 6.6 tons). Further, this gap 130 provides back of cab access (BOCA) to allow a user to get between the cab 108 and the trailer 104. Such BOCA may be required by the Federal Motor Carrier Safety Regulations (e.g., for access to air and/or electrical connections of the truck 102 and/or trailer 104). The gap 130 further provides clearance for pivoting movement of the cab 108 relative to the trailer 104 about the vertical axis.

In certain embodiments, the truck 102 is a cab-over engine (COE) configuration, wherein the cab 108 of the truck 102 is positioned above the engine and/or front axle 109. Such a configuration is advantageous in certain jurisdictions that limit a total overall length of a truck 102. As noted above, certain jurisdictions limit a front axle load, such as to less than 6.6 tons. Accordingly, the gap 130 between the truck 102 and the trailer 104 can be challenging to reduce. Some trucks 102 include deflectors mounted to the cab 108 to improve aerodynamic performance, but such deflectors are often limited in overall length (e.g., 0.4 meters), which is insufficient to fully close the gap 130. Increasing a length of air deflectors is challenging because the air deflectors are typically thin sheet metal, which are not self-supporting or able to withstand aerodynamic loads.

A panel apparatus 132 (which may also be referred to as an aerodynamic panel apparatus) is configured to be mounted behind the cab 108 of the truck 102 (e.g., to the rear wall 118 of the cab 108). The panel apparatus 132 is positioned within the gap 130 between the cab 108 and the trailer 104, and extends between the rear wall 118 of the cab 108 and the front 124 of the trailer 104. The panel apparatus 132 includes a deflector 134A (which may also be referred to herein as a panel deflector, air deflector, fairing, cab fairing, etc.) pivotable in an inboard direction. It is noted that only one panel apparatus 132 is shown on one side of the tractor-trailer combination vehicle 100, but that another panel apparatus 132 is similarly mounted on the other side of the tractor-trailer combination vehicle 100.

The deflector 134A is approximately the height of the cab 108 and/or the trailer 104. Further, the deflector 134A extends along a length of the truck 102 to substantially close the gap 130. Accordingly, in certain embodiments, the deflector 134A may have a length in a range of about 6 to 12 inches (15.2 cm to 30.5 cm). As a result, the panel apparatus 132 provides a surface spanning between the sidewalls 120 of the cab 108 and the sidewalls 126 of the trailer 104 when in a closed orientation (which may also be referred to as a straight orientation). This deflects air from entering the gap 130, which would otherwise increase drag. In other words, the panel apparatus 132 guides an air flow along corresponding sidewalls 120 of the cab 108 to the sidewalls 126 of the trailer 104 for improved aerodynamics (e.g., reduced drag) and/or increased vehicle performance (e.g., improved fuel economy). In particular, the panel apparatus 132 provides a substantially seamless transition from the sidewalls 120 of the cab 108 to the sidewalls 126 of the trailer 104. By positioning the deflector 134A to align with the sidewalls 126 of the trailer 104, the panel apparatus 132 does not widen or otherwise enlarge the aerodynamic profile (frontal area) of the tractor-trailer combination vehicle 100. The deflector 134A does not extend further outward than the sidewalls 120 of the cab 108.

The panel apparatus 132 closes a substantial portion of the gap 130 between the cab 108 and the trailer 104 thereby improving aerodynamic performance while also providing BOCA (among other advantages). As explained in more detail below, the deflector 134A of the panel apparatus 132 provides a slot between the deflector 134A and the back of the cab 108 to improve aerodynamic performance. Further, the panel apparatus 132 is mounted to the chassis 106 (rather than the cab 108), allowing for an increased length of a deflector 134A of the panel apparatus 132, which also improves aerodynamic performance.

Figure 2A:
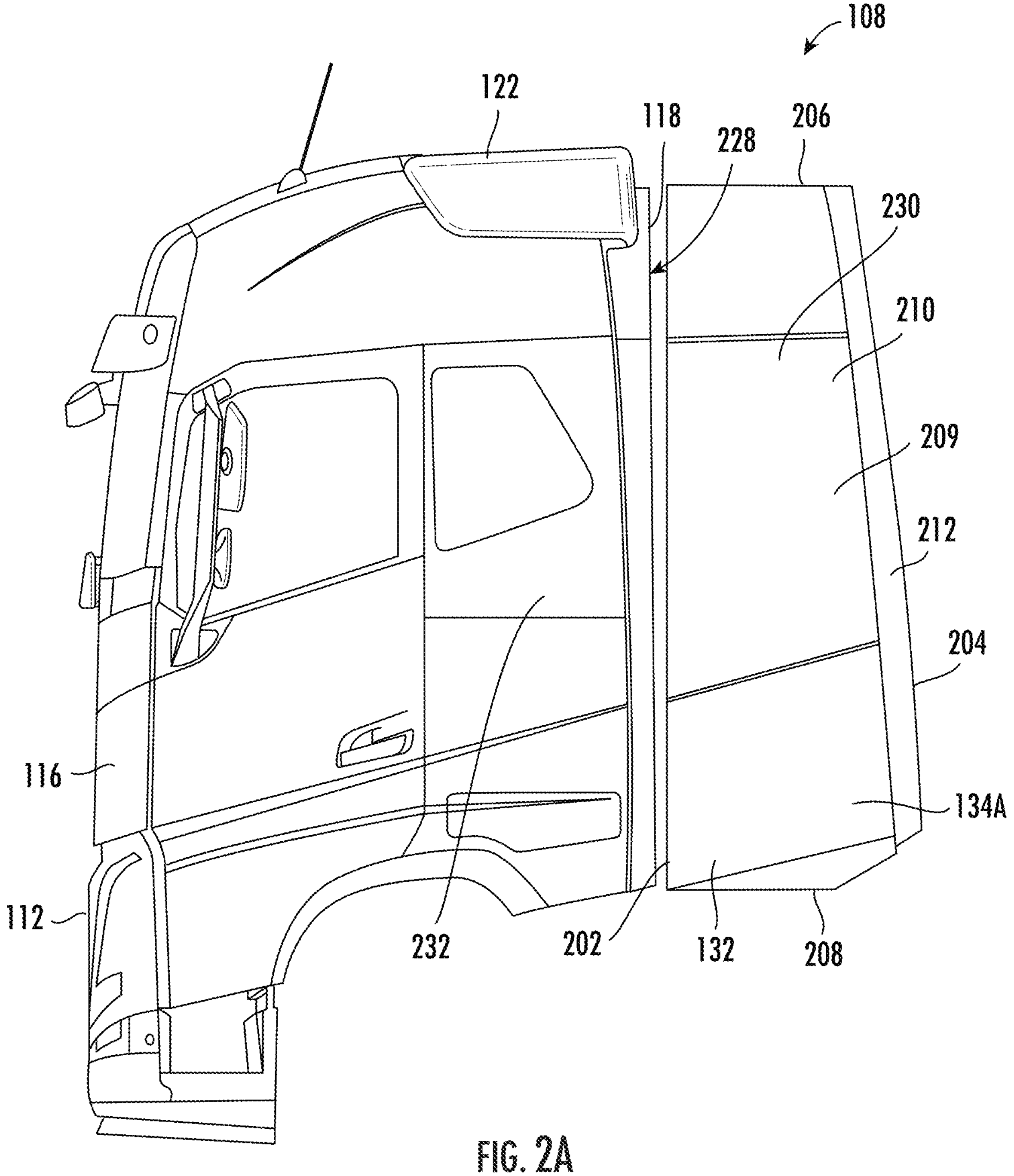
FIG. 2A is a side view of the cab and panel apparatus illustrating a slot therebetween.
Figure 2B:
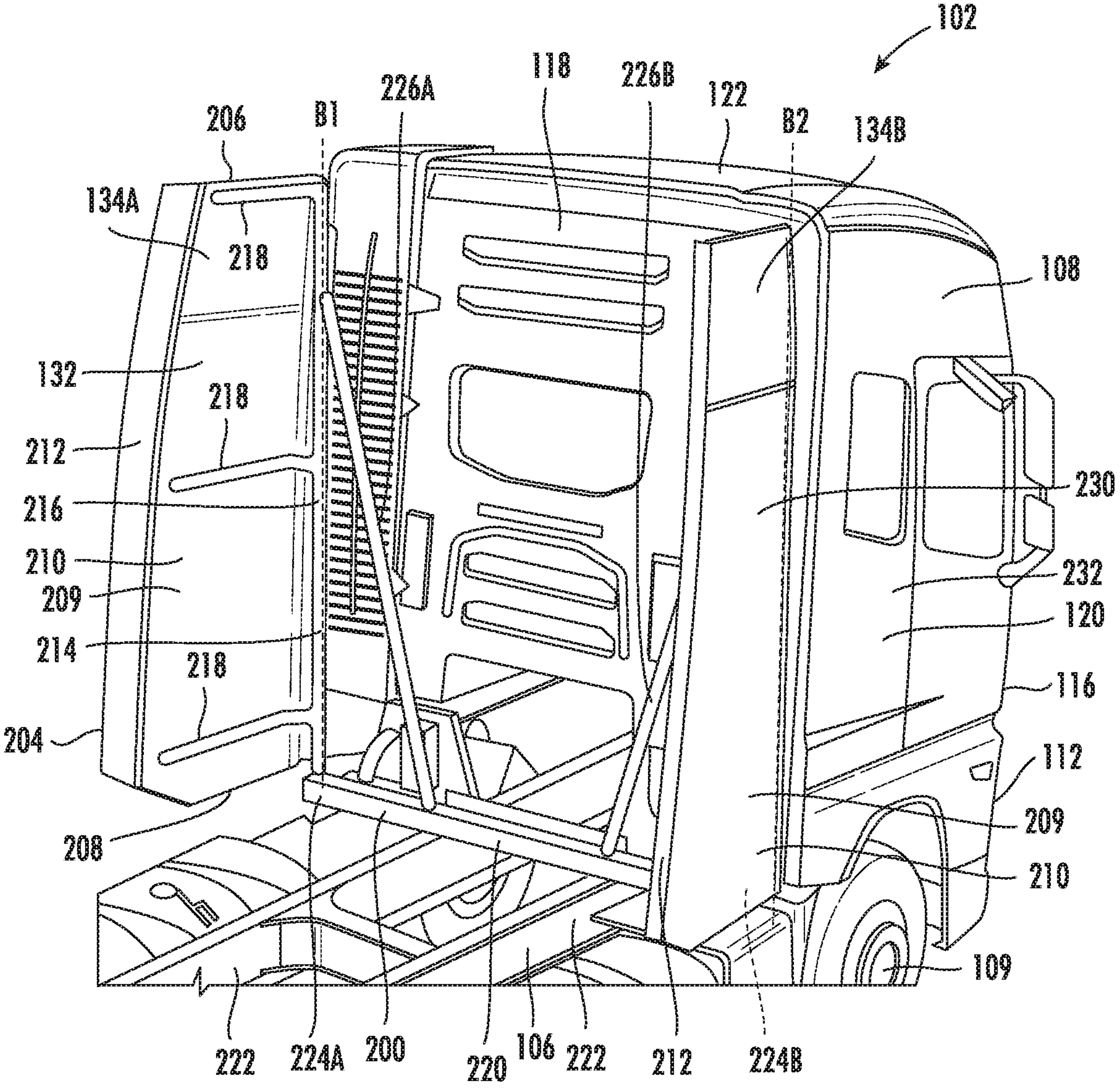
FIG. 2B is a rear perspective view of the cab and panel apparatus illustrating mounting of the panel apparatus to a chassis of the cab.

FIGS. 2A-2B are views illustrating the panel apparatus 132. The panel apparatus 132 includes a left deflector 134A and a right deflector 134B. The left deflector 134A and the right deflector 134B are attached to the chassis 106 by a mounting assembly 200.

The left deflector 134A has a frontward edge 202, a rearward edge 204, a top edge 206, and a bottom edge 208. The frontward edge 202 of the left deflector 134A is positioned proximate the rear wall 118 of the cab 108 of the truck 102 and inboard relative to the sidewall 120 of the cab 108. In certain embodiments, the left deflector 134A includes a body 209 with a panel 210 and a lip 212 attached to and positioned rearward of the panel 210. In certain embodiments, the panel 210 includes a rigid material (e.g., plastic material) and the lip 212 includes an elastomeric material (e.g., rubber material). In certain embodiments, the lip 212 flares rearward and outward from a rear edge of the left sidewall 120 of the truck 102. A deflector length of the left deflector 134A is defined from the frontward edge 202 to the rearward edge 204, and may vary along a height of the left deflector 134A. Accordingly, in certain embodiments, the deflector length along the top edge 206 of the left deflector panel is at least 0.7 meters, and the deflector length along the bottom edge 208 of the left deflector 134A is at least 1.2 meters. In other embodiments, the deflector length may be further increased. This is significantly longer than many other similar deflectors that are directly attached to the cab 108 of the truck 102, which may be a maximum of about 0.4 meters.

The left deflector 134A further includes a brace 214 including a vertical rod 216 and one or more horizontal rods 218 extending generally perpendicularly from the vertical rod 216. The horizontal rods 218 are spaced along a vertical length of the vertical rod 216. It is noted that the right deflector 134B includes similar features as those described regarding the left deflector 134A.

The mounting assembly 200 includes a bracket 220 attached to the chassis 106. In particular, the bracket 220 may be configured to mount to each mounting rail 222 of the chassis 106. The vertical rod 216 of the left deflector 134A is rotatably attached at a left side 224A of the bracket 220, and the vertical rod 216 of the right deflector 134B is rotatably attached at a right side 224B of the bracket 220. In this way, the left deflector 134A is independently rotatable about an axis B1 relative to the bracket 220 and the truck 102, and the right deflector 134B is independently rotatable about an axis B2 relative to the bracket 220 and the truck 102. In certain embodiments, the left deflector 134A and the right deflector 134B are configured to rotate inwardly from a deployed position to a folded position. In other embodiments, the left deflector 134A and the right deflector 134B are configured to rotate outwardly from a deployed position to an open position.

The mounting assembly 200 further includes a left cross-support 226A extending from the bracket 220 to the vertical rod 216 of the left deflector 134A. Similarly, the mounting assembly 200 includes a right brace 226B extending from the bracket 220 to the vertical rod 216 of the right deflector 134B. Accordingly, the left deflector 134A and the right deflector 134B are fully supported by the mounting assembly 200 and are not attached or otherwise supported by the cab 108.

A distance from the rearward edge 204 of the left deflector 134A and the front 124 of the trailer 104 may vary between 0.88 m and 1.59 m. This is a significant reduction in distance compared to other deflectors which have a gap from the rearward edge of the deflector to the front of the trailer between 1.5 m and 2.2 m.

The left deflector 134A is positioned proximate the sidewall 120 of the cab 108. A frontward edge 202 of the left deflector 134A is offset from the rear wall 118 of the cab 108 to define a slot 228 (may also be referred to as an elongated slot, elongated gap, etc.). The slot 228 is generally vertically elongated, extending from the top edge 206 and the bottom edge 208. In certain embodiments, the slot 228 may be at least 25 mm in width between the rear wall 118 of the cab 108 and the frontward edge 202 of the left deflector 134A. As explained in more detail below, the slot 228 improves aerodynamic performance of the tractor-trailer combination vehicle 100. In a closed orientation, an outer surface 230 of the body 209 of the left deflector 134A is generally aligned with an outer surface 232 of a left sidewall 120 of the cab 108 of the truck 102. As explained in more detail below, the left deflector 134A is devoid of any direct attachment to the cab 108. Instead, the left deflector 134A is self-supporting and mounted to the chassis 106. Accordingly, the cab 108 may rotate relative to the chassis 106 and the panel apparatus 132 (including the left deflector 134A). Further, the suspension of the cab 108 allows relative movement of the cab 108 relative to the chassis 106 and the panel apparatus 132 while the truck 102 is in motion.

Figure 3A:
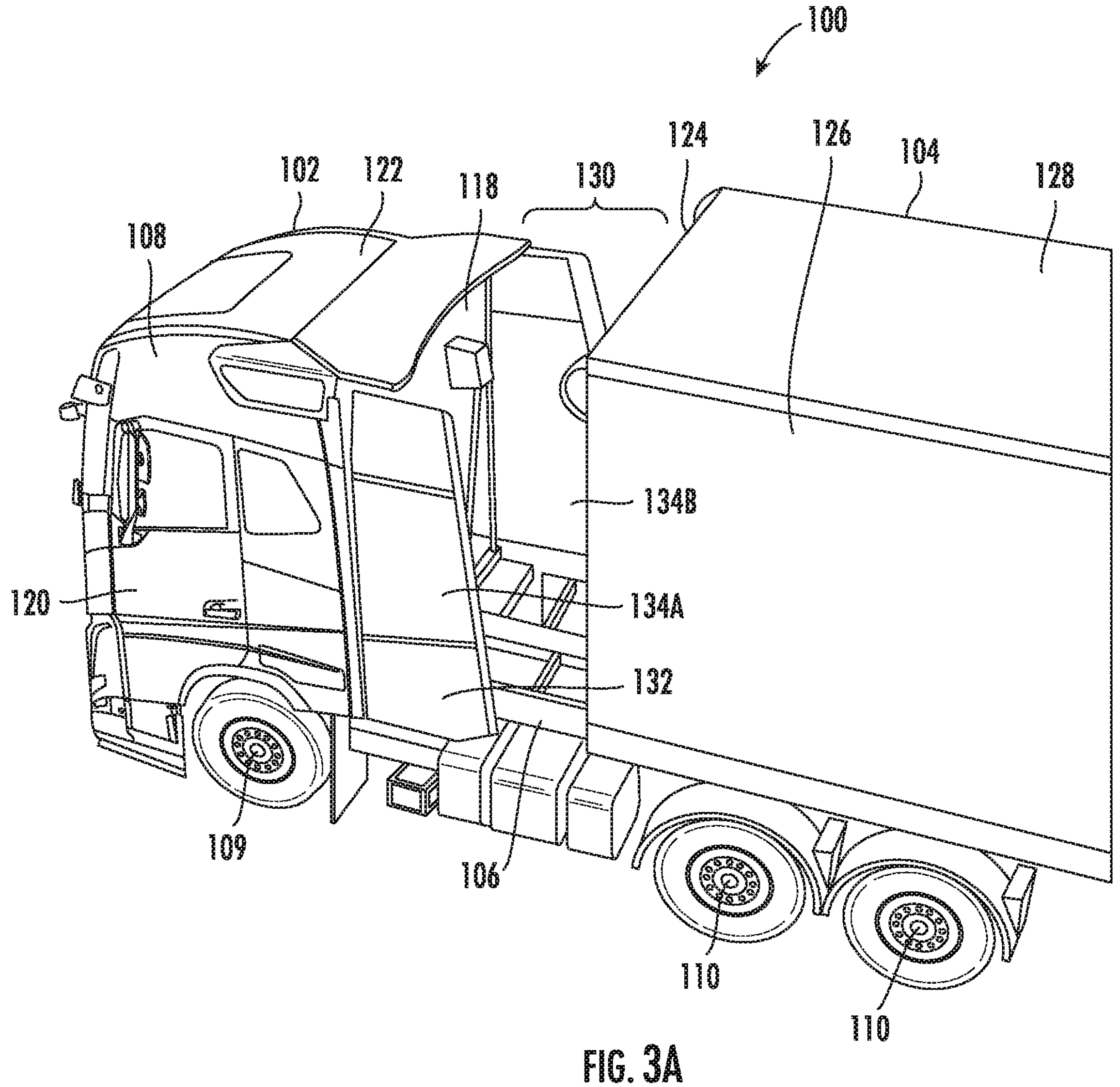
FIG. 3A is a perspective view of the tractor-trailer combination vehicle with the panel apparatus in a deployed position.
Figure 3B:
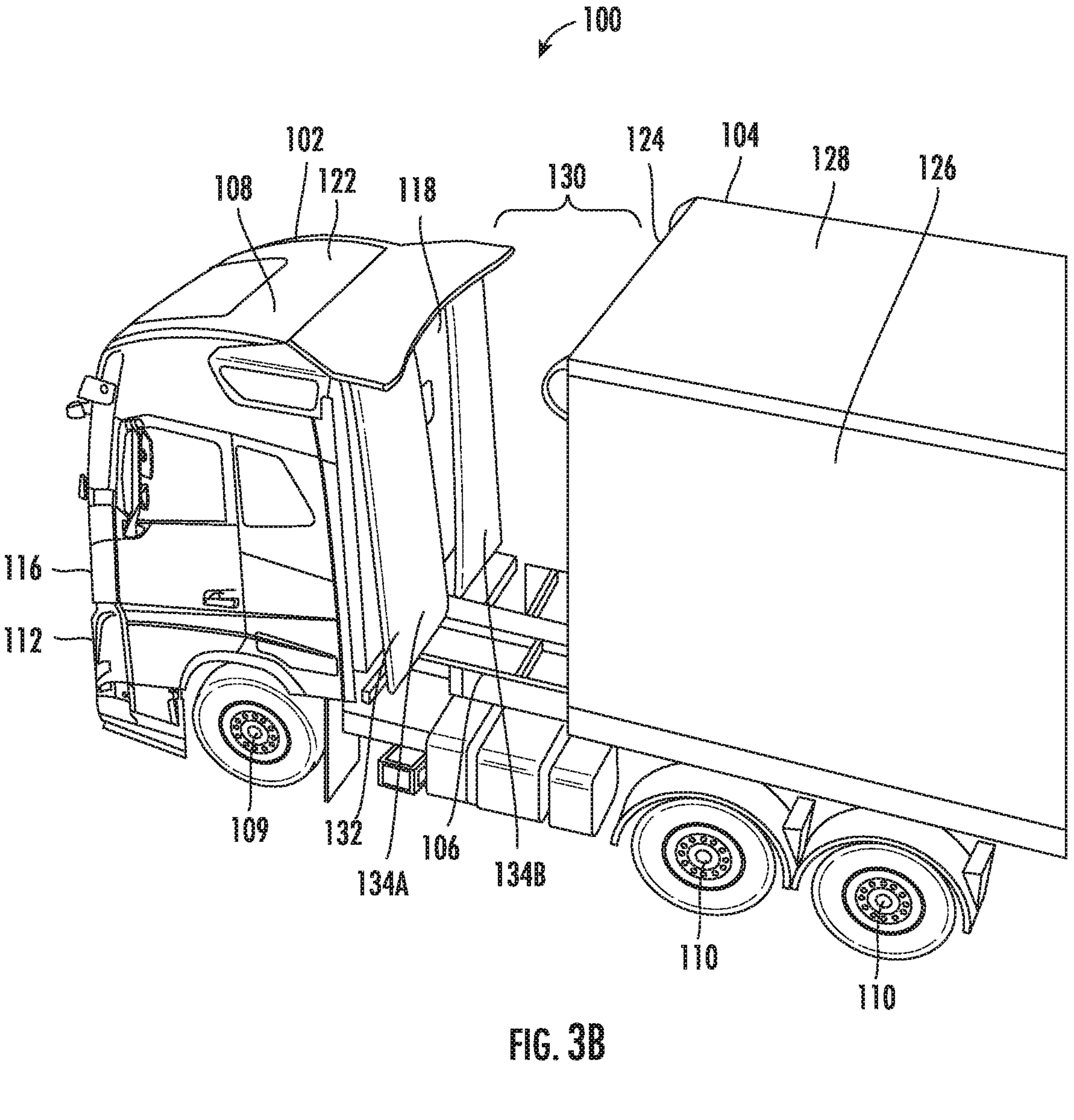
FIG. 3B is a perspective view of the tractor-trailer combination vehicle with the panel apparatus in a folded position.

FIGS. 3A-3B are views of the tractor-trailer combination vehicle 100 with the panel apparatus 132 in a deployed position and a folded position. In particular, in FIG. 3A, the left deflector 134A and the right deflector 134B are in a deployed position such that the left deflector 134A is generally aligned with the left sidewall 120 of the cab 108 of the truck 102 (and generally perpendicular to the rear wall 118 of the cab 108 of the truck 102), and the right deflector 134B is generally aligned with the right sidewall 120 of the cab 108 of the truck 102 (and generally perpendicular to the rear wall 118 of the cab 108 of the truck 102).

In FIG. 3B, the left deflector 134A and the right deflector 134B are in a folded position such that the left deflector 134A is generally perpendicular to the left sidewall 120 of the cab 108 of the truck 102 (and generally parallel to the rear wall 118 of the cab 108 of the truck 102), and the right deflector 134B is generally perpendicular to the right sidewall 120 of the cab 108 of the truck 102 (and generally parallel to the rear wall 118 of the cab 108 of the truck 102).

Although the left deflector 134A and the right deflector 134B are illustrated as being inwardly rotatable, in certain embodiments, the left deflector 134A and the right deflector 134B may be outwardly rotatable, such as to provide improved BOCA (e.g., for access to air and/or electrical connections of the truck 102 and/or the trailer 104).

Figure 3C:
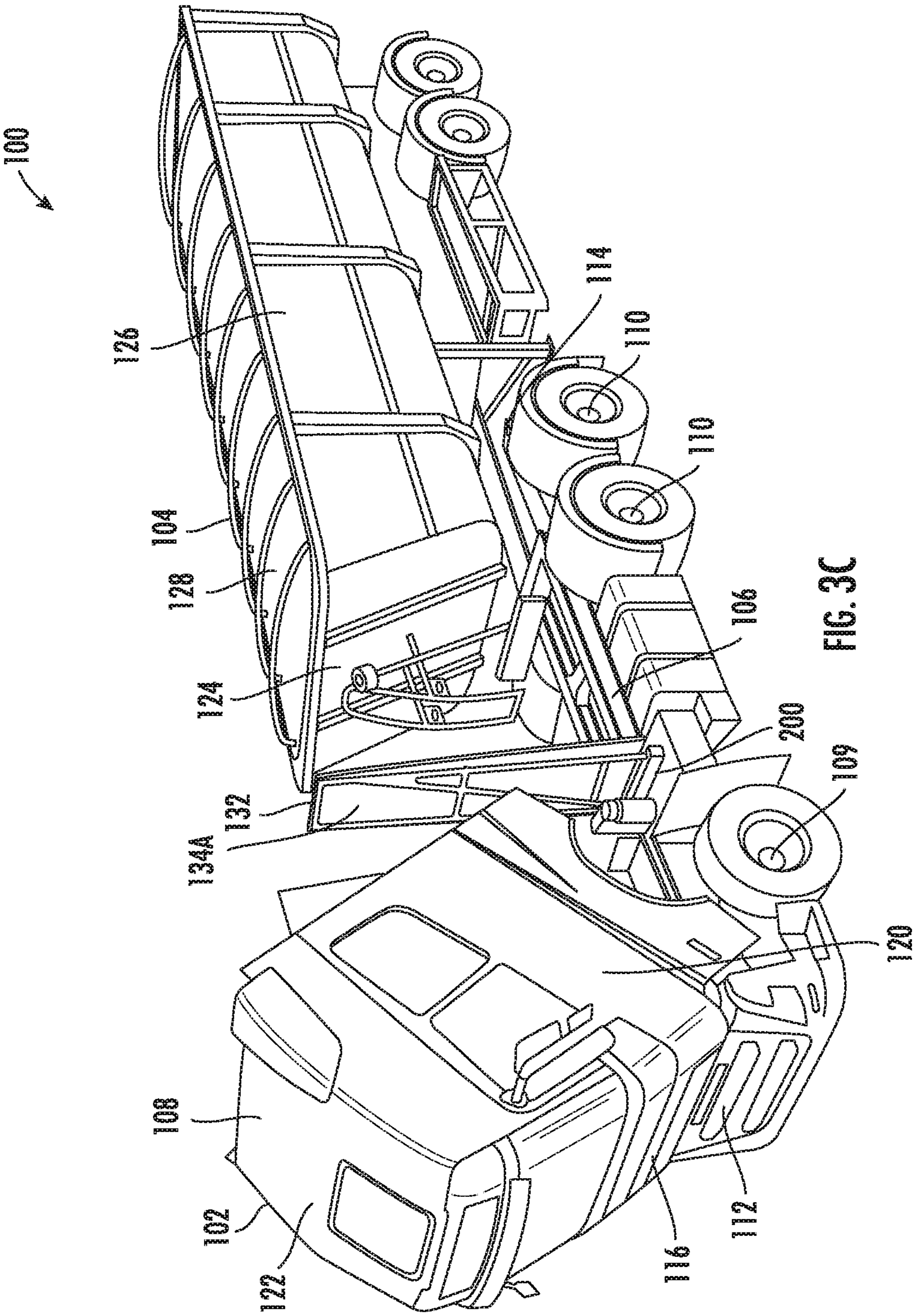
FIG. 3C is a perspective view of the tractor-trailer combination vehicle illustrating rotation of the cab relative to the chassis and the panel apparatus mounted to the chassis of the tractor-trailer combination vehicle.

FIG. 3C is a view of the truck 102 illustrating rotation of the cab 108 relative to the chassis 106 and the panel apparatus 132 mounted to the chassis 106 of the truck 102. As noted above, the panel apparatus 132 is mounted to the chassis 106 and is not attached to or otherwise supported by the cab 108 of the truck 102. Accordingly, the cab 108 may be rotated between a closed position and an open position regardless of whether the panel apparatus 132 is in a deployed position or a folded position.

In certain embodiments, a mechanical hinge may be used to rotate the left deflector 134A and the right deflector 134B relative to the rear wall 118 of the cab 108. In other embodiments, a high torque and/or a low speed electric motor may be used instead of or in addition to the mechanical hinge. The electric motor may be used to maintain the left deflector 134A and/or the right deflector 134B in the deployed position or to move the left deflector 134A and/or right deflector 134B between the deployed position and the folded position. Further, the electric motor may be used when the truck 102 reaches a certain minimum threshold speed.

Figure 4A:
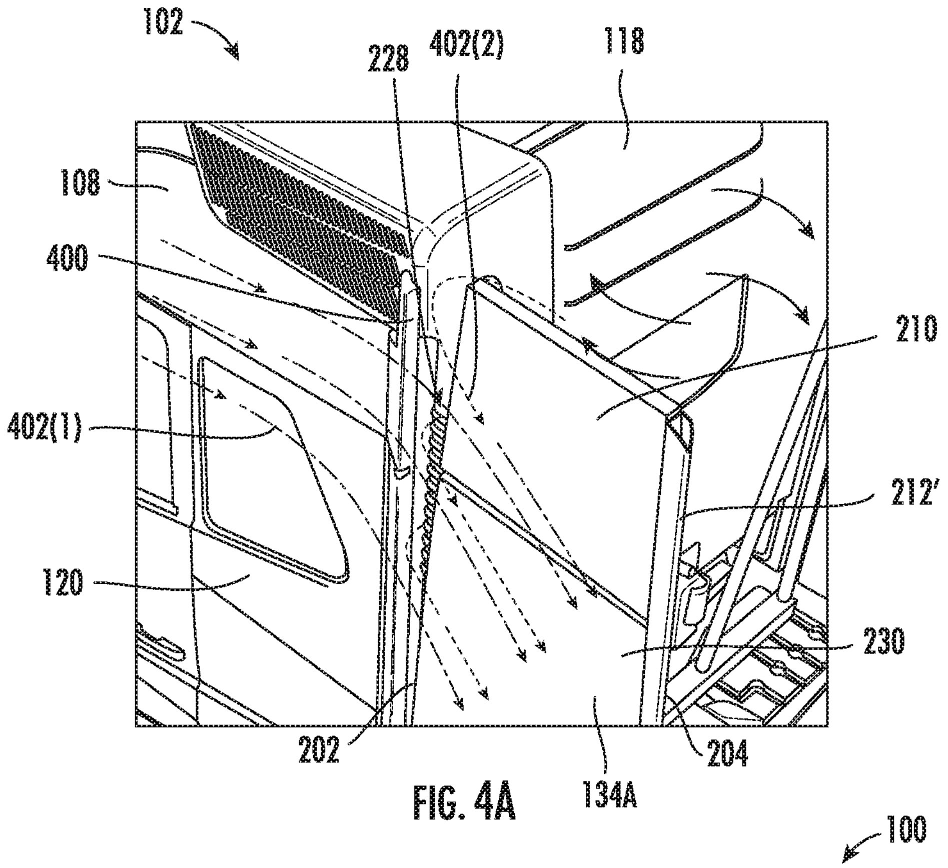
FIG. 4A is a perspective view illustrating a cab with a lip deflector and a deflector with a rear flared lip, and associated airflow.
Figure 4B:
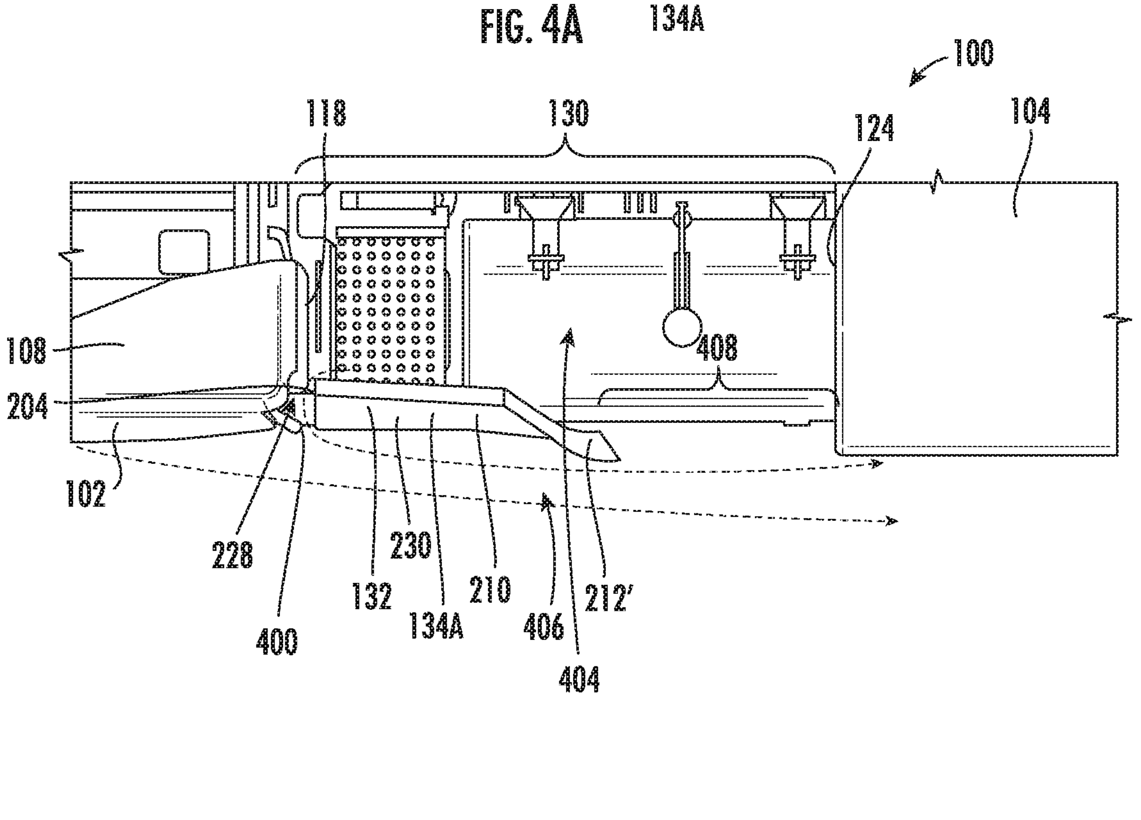
FIG. 4B is a top view of the cab and deflector of FIG. 4A.

FIGS. 4A-4B are views of a cab 108 with a lip deflector 400 and a left deflector 134A with a rear flared lip 212', and associated airflow 402(1), 402(2). As noted above, the frontward edge 202 is positioned inboard of the sidewall 120 of the cab 108 for aerodynamic performance of the truck 102.

A slot 228 provides clearance for the panel apparatus 132 (and the deflectors 134A, 134B) to move relative to the cab 108 of the truck 102. The slot 228 further improves aerodynamic performance of the truck 102. In particular, the slot 228 facilitates extraction of airflow 402(1) from an inboard area 404 to an outboard area 406. The inboard area 404 is defined as the area generally defined by the rear wall 118 of the cab 108, the left deflector 134A, the right deflector 134B, and the trailer 104. Due to a pressure differential, the airflow 402(1) is pulled from the inboard area 404 through the slot 228, and then to an outer surface 230 of the left deflector 134A. As explained in more detail below, this reduces the overall pressure within the inboard area 404, thereby improving aerodynamic performance. In certain embodiments, the left deflector 134A may include slots (i.e., gills) in a panel 210 to further extract air from the inboard area 404 to the outboard area 406 to reduce the pressure within the inboard area 404.

The lip deflector 400 is positioned at a rear edge of the left sidewall 120 and extends from the rear wall 118 rearward and outward. The lip deflector 400 generally extends between a top 122 of the cab 108 and a chassis 106 (see FIG. 1). The lip deflector 400 directs the airflow 402(2) outward and over the slot 228. The left deflector 134A includes the rear flared lip 212', such that a rearward edge 204 is outboard of the frontward edge 202. As a result, the rear flared lip 212' directs the airflow 402(2) around a gap 408 formed between the rear flared lip 212' and the trailer 104. Directing the airflow 402(1), 402(2) outward improves aerodynamic performance.

Figure 5A:
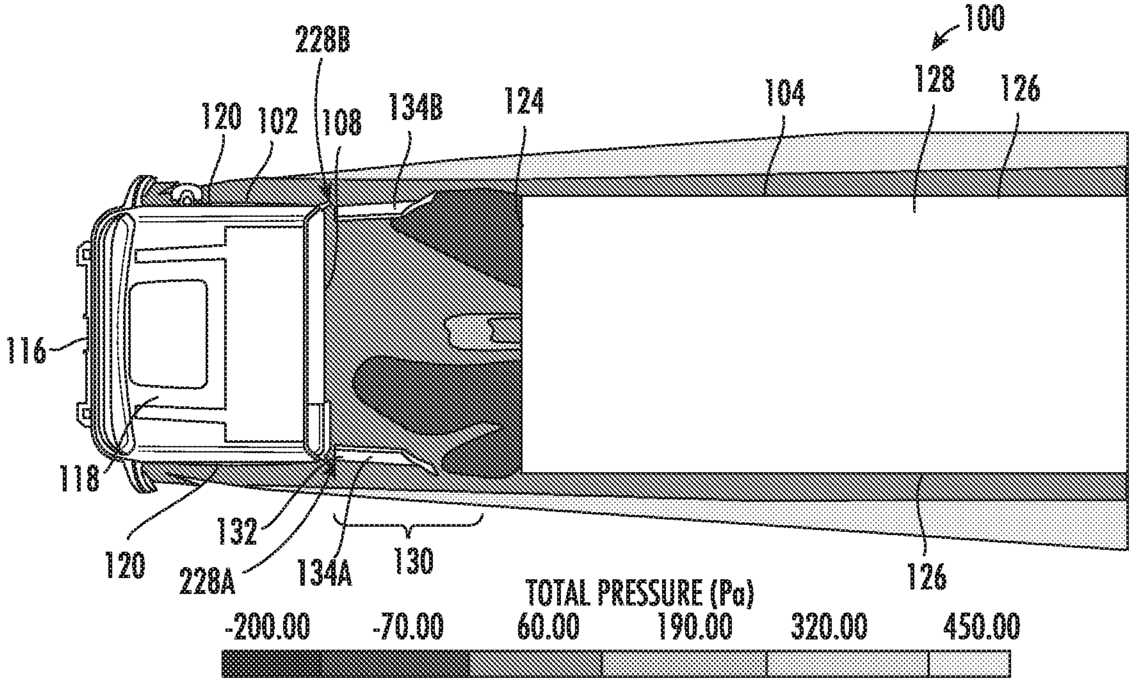
FIG. 5A is a top view illustrating an air pressure distribution of the tractor-trailer combination vehicle of FIG. 1 with extended length deflectors.
Figure 5B:
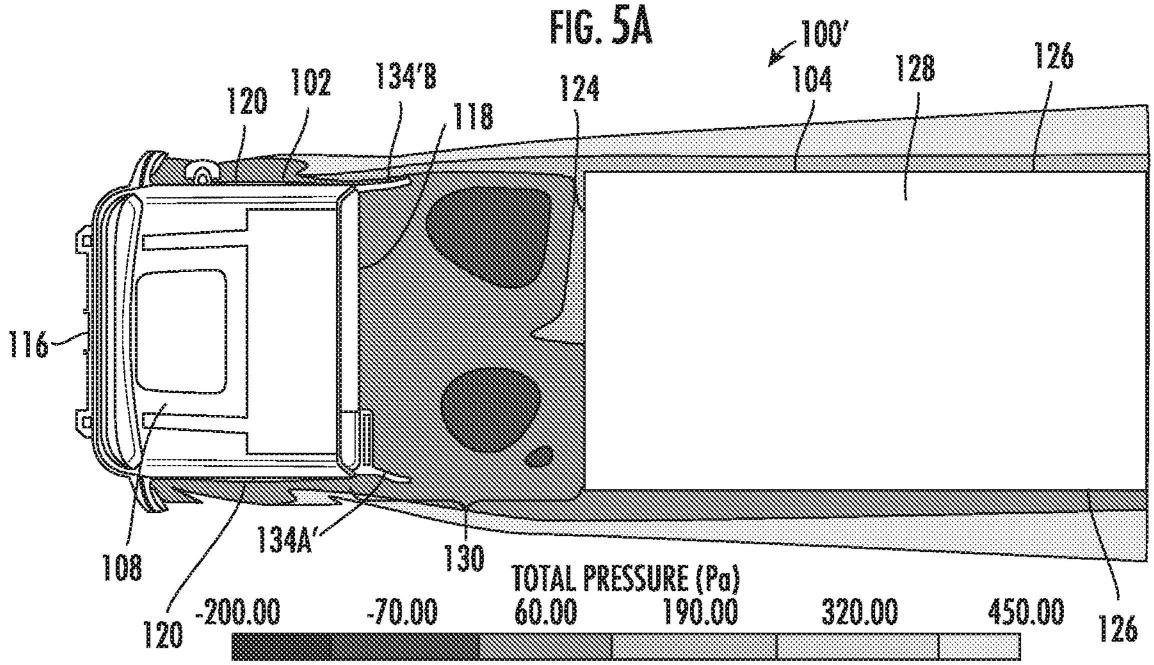
FIG. 5B is a top view illustrating an air pressure distribution of a tractor-trailer combination vehicle with reduced length deflectors.

FIGS. 5A-5B are views of an air pressure distribution comparing tractor-trailer combination vehicles 100, 100' with extended length deflectors 134A, 134B of the present disclosure and reduced length deflectors 134A', 134B'. In particular, FIG. 5A is a top view illustrating an air pressure distribution of the tractor-trailer combination vehicle 100 of FIG. 1 with extended deflectors 134A, 134B and slots 228A, 228B between the cab 108 and the deflectors 134A, 134B. Comparatively, FIG. 5B is a top view illustrating an air pressure distribution of a tractor-trailer combination vehicle 100' with a reduced length deflectors 134A', 134B'. Further, the tractor-trailer combination vehicle 100' does not include slots 228A, 228B. As illustrated, the tractor-trailer combination vehicle 100 experiences less total pressure than the tractor-trailer combination vehicle 100'. Accordingly, the tractor-trailer combination vehicle 100 also experiences improved aerodynamic performance.

Those skilled in the art will recognize improvements and modifications to the preferred embodiments of the present disclosure. All such improvements and modifications are considered within the scope of the concepts disclosed herein and the claims that follow.

The invention claimed is:

1. A vehicle, comprising:

a chassis comprising a front axle and a rear axle;

a cab mounted to the chassis, the cab having a first sidewall, a second sidewall, and a rear wall extending between the first and second sidewalls; and a first air deflector positioned proximate to the first sidewall, the first air deflector comprising a body having an outer surface and a front edge configured to be positioned proximate the cab, the outer surface of the body of the first air deflector aligned with an outer surface of the first sidewall in a deployed position, the front edge of the first air deflector offset from the rear wall to define a first gap of at least 25 mm.

2. The vehicle of claim 1, wherein the vehicle comprises a cab-over engine vehicle.

3. The vehicle of claim 1, wherein the front axle load is less than about 6.6 tons.

4. The vehicle of claim 1, wherein the first sidewall of the cab further comprises a lip flaring rearward and outward from a rear edge of the first sidewall.

5. The vehicle of claim 1, wherein the first air deflector is mounted to the chassis of the vehicle.

6. The vehicle of claim 5, wherein the first air deflector is mounted to a bracket attached to a frame rail of the chassis.

7. The vehicle of claim 5, wherein the first air deflector is configured to rotate inwardly from the deployed position to a folded position.

8. The air deflector of claim 1, wherein the body has a deflector length from the front edge to a rear edge of at least 0.70 meters.

9. The vehicle of claim 1, further comprising a second air deflector positioned proximate to the second sidewall, the second air deflector comprising a body having an outer surface and a front edge configured to be positioned proximate the cab, the outer surface of the body of the second air deflector aligned with an outer surface of the second sidewall in a deployed position, the front edge of the second air deflector offset from the rear wall of the cab to define a second gap.

10. A vehicle, comprising:

a chassis comprising a front axle and a rear axle;

a cab mounted to the chassis, the cab having a first sidewall, a second sidewall, and a rear wall extending between the first and second sidewalls; and a first air deflector positioned proximate to the first sidewall, the first air deflector comprising a body having an outer surface and a front edge configured to be positioned proximate the cab, the outer surface of the body of the first air deflector aligned with an outer surface of the first sidewall in a deployed position, the first air deflector mounted to the chassis of the vehicle;

wherein the first air deflector is not attached to and is unsupported by the cab.

11. The vehicle of claim 10, wherein the vehicle comprises a cab-over engine vehicle.

12. The vehicle of claim 10, wherein the front axle load is less than about 6.6 tons.

13. The vehicle of claim 10, wherein the first air deflector is mounted to a bracket attached to a frame rail of the chassis.

14. The vehicle of claim 13, wherein the first air deflector is configured to rotate inwardly from the deployed position to a folded position.

15. The vehicle of claim 10, wherein the body has a deflector length from the front edge to a rear edge of at least 0.70 meters.

16. The vehicle of claim 10, wherein the front edge of the first air deflector is offset from the rear wall to define a first gap.

17. The vehicle of claim 10, wherein one of the two sidewalls of the cab further comprises a lip flaring rearward and outward from a rear edge of the one of the two sidewalls.

18. The vehicle of claim 10, further comprising a second air deflector positioned proximate to the second sidewall, the second air deflector comprising a body having an outer surface and a front edge configured to be positioned proximate the cab, the outer surface of the body of the second air deflector aligned with an outer surface of the second sidewall in a deployed position, the front edge of the second air deflector offset from the rear wall of the cab to define a second gap.

* * * * *